United States Patent [19]

Flanders et al.

[11] Patent Number: 5,239,294

[45] Date of Patent: Aug. 24, 1993

[54] METHOD AND APPARATUS FOR AUTHENICATION AND PROTECTION OF SUBSCRIBERS IN TELECOMMUNICATION SYSTEMS

[75] Inventors: Mary B. Flanders, Wood Dale; Louis D. Finkelstein, Wheeling; Larry C. Puhl, Sleepy Hollow, all of Ill.

[73] Assignee: Motorola, Inc., Schaumburg, Ill.

[21] Appl. No.: 626,227

[22] Filed: Dec. 7, 1990

Related U.S. Application Data

[63] Continuation-in-part of Ser. No. 554,951, Jul. 16, 1990, abandoned, which is a continuation-in-part of Ser. No. 378,721, Jul. 12, 1989, abandoned.

[51] Int. Cl.$^5$ ............................................. H04Q 1/00
[52] U.S. Cl. .......................... 340/825.34; 340/825.31; 340/825.44; 379/62; 379/63; 380/43; 380/46; 380/49
[58] Field of Search .................. 340/825.33, 825.34, 340/825.69, 825.72, 825.3, 825.31, 825.44; 379/59, 62, 63, 60; 380/42, 43, 46, 49, 50

[56] References Cited

U.S. PATENT DOCUMENTS

| | | | |
|---|---|---|---|
| 4,023,012 | 5/1977 | Ano et al. | 340/825.34 |
| 4,034,013 | 5/1977 | Kinker | 340/825.34 |
| 4,048,475 | 9/1977 | Yoshida | 340/825.33 |
| 4,315,101 | 2/1982 | Atalla | 340/825.34 |
| 4,535,333 | 8/1985 | Twardowski | 340/825.31 |
| 4,761,808 | 8/1988 | Howard. | |
| 4,814,741 | 3/1989 | Hongo et al. | 340/825.72 |
| 4,992,783 | 2/1991 | Zdunek | 340/825.34 |
| 5,023,908 | 6/1991 | Weiss | 340/825.34 |
| 5,060,266 | 10/1991 | Dent | 380/49 |
| 5,081,679 | 1/1992 | Dent | 380/49 |
| 5,091,942 | 2/1992 | Dent | 380/46 |

FOREIGN PATENT DOCUMENTS

| | | |
|---|---|---|
| 0447380A1 | 9/1991 | European Pat. Off. . |
| 3439120A1 | 5/1986 | Fed. Rep. of Germany . |
| 92/02089 | 2/1992 | PCT Int'l Appl. . |

OTHER PUBLICATIONS

"Proposals for Authentication", presented in Salt Lake City, Utah, TIA Technical Subcommittee, TR45.3 Digital Cellular Standards Committee, Jul. 23-27, 1990.
"Implementation of User Speech and Data Privacy", presented in Salt Lake City, Utah, TIA Technical Subcommittee, TR45.3 Digital Cellular Standards Committee, Jul. 23-27, 1990.
Electronic Industries Association Standard 553 (EIA-553), "Mobile Station – Land Station Compability Specification".
European Groupe Speciale Mobile Recommendation – GSM 2.09 "Security Aspects", version 3.0.0, released Feb. 15, 1988.

(List continued on next page.)

*Primary Examiner*—Donald J. Yusko
*Assistant Examiner*—Brian Zimmerman
*Attorney, Agent, or Firm*—Shawn B. Dempster

[57] ABSTRACT

Radio frequency based cellular telecommuication systems often require a subscriber (10) to maintain a proprietary identifier (19) or serial number (18) which is transmitted to a fixed network communication unit (20) to verify the authenticity of the subscriber (10). An enciphering and call sequencing method and apparatus are provided which can decrease unauthorized detection of these proprietary ID's (18, 19). This method and apparatus permit efficient roaming by allowing authentication variables for multiple calls to be sent from the "home" system (20) to the "visted" system and stored by the "visted" system for use with subsequent calls. Further, a method and apparatus are provided which force the authenticating mobile (10) to use information that only it has available to itself. Furthermore, a method and apparatus are provided which allow continued encryption integrity during handoffs by maintaining a record of pseudo random events between a subscriber unit (10) and any radio communication unit (20) and using that record as an encryption variable.

52 Claims, 5 Drawing Sheets

OTHER PUBLICATIONS

European Groupe Special Mobile Recommendation – GSM 2.17 "Subscriber Identity Modules, Functional Characteristics", version 3.0.0, issued Oct. 1988.

European Groupe Special Mobile Recommendation – GSM 3.20 "Security Related Network Functions", version 3.2.0, released Apr. 15, 1989.

European Groupe Special Mobile Recommendation – GSM 12.03 "Security Management", version 3.0.0, dated Nov. 15, 1988.

"Definition of Authentication Algorithm", presented in Salt Lake City, Utah, TIA Technical Subcommittee, TR45.3 Digital Cellular Standards Committee, Jul. 23–27, 1990.

"Definition on Key Generation Algorithm", presented in Salt Lake City, Utah, TIA Technical Subcommittee, TR45.3 Digital Cellular Standards Committee, Jul. 23–27, 1990.

METHOD AND APPARATUS FOR AUTHENICATION AND PROTECTION OF SUBSCRIBERS IN TELECOMMUNICATION SYSTEMS

This is a continuation-in-part of application Ser. No. 07/554,951, filed Jul. 16, 1990 which is a continuation-in-part of application Ser. No. 07/378,721, filed Jul. 12, 1989 and both now abandoned.

TECHNICAL FIELD

This invention relates generally to communication systems and more particularly to radio frequency (RF) cellular telecommunication systems.

BACKGROUND OF THE INVENTION

Cellular radio telephone systems typically include subscriber units (such as mobile or portable units) which communicate with a fixed network communication unit via RF transmissions. A typical fixed communication network includes at least a base station and a switching center. The switching center a subscriber unit accesses may not be his "home" switching center. In this case, the subscriber unit is termed a roamer. The switching center he accessed (termed the "visted" switching center) will communicate with his "home" switching center via the public switched telephone network (PSTN). One responsibility of the fixed network communication unit is to grant use of hte communication system to the subscriber unit after the requesting subscriber unit meets the authentication requirements of the system. In a typical cellular telephone communication system, each subscriber unit is assigned a telephone number (mobile identification number) (MIN) and an identification number (or serial number) (SN) which uniquely identifies the subscriber to any fixed network communication unit. Each subscriber unit has a unique identification number that distinguishes it from other subscriber units. The fixed network communication unit has access to these identification numbers through a database. Often these numbers are used by the fixed network communication units to bill subscribers for the time the subscriber uses the system. In the case of a roaming subscriber unit, the "visted" switching center must communicate with the subscriber's "home" system database to authenticate and bill the subscriber unit. If this communication is required for each call a subscriber unit makes, significant call setup delays will occur. When the subscriber calls another unit, he enters the phone number he wishes to call. The dialed phone number becomes the data to be sent to the fixed network communication unit. Data may also include other information regarding a third communication unit such as a unit's location.

Detection of a legitimate subscriber's identification number may be accomplished by RF eavesdropping or by purposeful or inadvertent divulgence of the MIN/SN combination by the radio telephone installer. Once the subscriber's telephone number and identification number is known (stolen), a thief may reprogram another subscriber unit with the stolen identification number causing two or more subscriber units to have the same MIN/SN combination. Cellular radio telephone systems have authentication procedures to deny access to subscribers not having legitimate identification numbers, but do not have the capability to detect multiple users or effectively neutralize the effect of an installer leaking subscriber identification numbers. Therefore, the legitimate user is billed for both the thief's use and his own use.

Several authentication techniques are known. EIA-553 section 2.3 specifies that each subscriber shall have a MIN and a factory set SN. The telephone number which the subscriber is attempting to contact is the data that is transmitted by the subscriber to the fixed network communication unit. Authentication is granted by this system if the MIN and corresponding SN are found in the fixed network communication unit database. Unfortunately, EIA-553 does not require the encipherment of the MIN or SN before transmission to the fixed network communication unit thereby permitting direct RF detection of any MIN or SN. In addition, this technique fails to provide protection against a thief that acquires a MIN/SN from an installer.

Another authentication technique is described in European cellular communication system recommendations generated by the Groupe Special Mobile (GSM); see sections: 02.09, 02.17, 03.20, and 12.03. This method additionally requires the subscriber to openly transmit a temporary mobile subscriber ID (TMSI) to the fixed network communication unit; the fixed network communication unit generates and sends a random number (RAND) to the subscriber. The enciphering technique requires the subscriber unit to autonomously retrieve at least three enciphering elements from its memory: a predetermined ciphering key, an SN (individual subscriber authentication key) and a MIN (international mobile subscriber identification number—IMSI). The subscriber then enciphers its SN and MIN using the cipher to construct the RAND into a signed response (SRES). The subscriber unit transmits this signed response back to the fixed network communication unit where the fixed network communication unit checks the SN, MIN, and ciphering key against its database using the subscriber's temporary ID (TMSI).

The fixed network communication unit generates its response to the same random number using the information retrieved from the database and compares the subscriber signed response to the fixed network communication unit generated response. If the responses are substantially equivalent, authentication is confirmed. The dialed telephone number is only allowed to be transmitted after authentication is granted. This system affords some protection against a thief that acquires the MIN/SN from an installer by enciphering the SN and reassigning a temporary TMSI each time the subscriber enters a different cell area.

Although one technique enciphers the subscriber's serial number before transmission, neither system detects multiple users. Detection of thieves once they acquire access is important to maintaining a secure system. Moreover, the random number transmission (required for encipherment) necessitates additional communication between the subscriber unit and the fixed network communication unit each time a call is made which increases the probability of transmission error and adds a transmission step to the fixed network communication unit's authentication protocol routine. In addition, authentication must be verified before the system will allow data to be accepted. Therefore data must be sent after the steps of the authentication procedure are complete.

Secure cellular systems also offer protection of conversations after authentication is granted. As is typical for cellular systems, the process of handing off a subscriber unit to another channel is needed for various reasons. These include maintaining communication link quality, minimizing co-channel interference between subscriber units, and managing traffic distributions. A handoff involves the transfer of communication between channels. Channelization may be in the form of time slots, frequencies, codes (as in spread spectrum type systems) and various combinations of these medium divisions. Handoffs include intracell handoffs, intercell handoffs, and intercluster handoffs. Intracell handoffs are those transfers between channels (voice or data) in the same cell; intercell handoffs are those transfers between channels in different cells, and intercluster handoffs are those transfers between channels in cells parented from different cell control units. In secure cellular systems wherein voice and/or data information is encrypted to avoid unauthorized detection of such information, handoffs introduce additional complications to maintaining encryption integrity.

In systems where absolute frame synchronization between base sites is not required, such as the proposed TDMA U.S. Digital Cellular system, subscriber units are only told which slots within a frame they must synchronize to after they are handed off. In a secure system however, voice encryption between the subscriber unit and any source basesite transceiver, typically requires an agreed starting point and must continue through the length of the call irrespective of the number of handoffs. At handoff, a conversation is already in progress, therefore lengthy gaps required to establish encryption synchronization must be avoided. Also, an intruder monitoring the channel at any point in the conversation should not be able to gain sufficient information to aid in any cryptanalysis effort.

One solution involves operating the encryption algorithm with a common mask that is reused for each slot of speech. However, this severely compromises the security of the encryption process since the same crypto-mask is repeated for each time slot thereby affording an intruder repeated chances for analyzing the same encryption process and consequently increasing the probability of decryption. At handoff this involves passing this mask from the source basesite (current serving basesite to the target basesite. This allows the encryption process to remain synchronized to the handoff channel. Also, since the speech coder continues to generate it's output sequence during pauses in the conversation (quiet periods) an intruder has a good chance of determining the encryption process during these pauses.

Another solution involves restarting the encryption process at each handoff. However, this requires the repetition of the exact cipher stream after each handoff. An intruder's probability of decoding the cipher stream each time a handoff occurs is greatly increased; particularly in microcellular systems. The method of encryption must allow for a high degree of variability to make decryption more difficult. As during the authentication process, any variable used in the encryption process should not be communicated over the airwaves.

Another solution involves using a continuous stream encryption process wherein the process must maintain its continuity during all handoffs for the same conversation. For example, the exact starting point would have to be agreed upon by the subscriber unit and source basesite. At handoff, the current contents of the encryption process as well as the exact point of transfer is agreed upon by the source basesite and the target basesite. This method does not readily lend itself to a non-synchronous system since the target site may not know the current stage of the encryption process. Also, the length of messages between basesites would increase since a large number of memory elements may be needed to define the history of the encryption algorithm as started by the subscriber unit so that the target site can generate the current state of the encryption process.

There exists a need for a substantially enhanced authentication technique for a cellular telecommunication system that detects fraudulent users and efficiently protects identification numbers from unauthorized detection. This technique should permit to access "visited" systems in an efficient and timely manner, while enabling the "visited" system to determine the legitimacy of the subscriber unit. The authentication method should restrict an illegitimate user's capacity to utilize the system in the case where access is inadvertently granted. Further, an adequate level of security resulting from encipherment should not require additional transmission processes or inject higher error levels during the authentication process. There also exists a need for an encryption process for use in a synchronous channel or a non-synchronous channel system that provides encryption integrity during handoffs between channels such that an intruder is substantially prevented from decoding the encryption process.

BRIEF SUMMARY OF THE INVENTION

These needs and others are substantially met through provision of the method for authentication and protection of subscribers in telecommunication systems disclosed below. This method describes an authentication technique for use between a first communication unit, such as a subscriber unit, and a second communication unit, such as a fixed network communication unit, wherein the first communication unit modifies an ID, known to both the first communication unit and the second communication unit (such as a serial number), using data as one enciphering key and a second ID (such as a Personal Identification Number-PIN) as a second enciphering key as well as a network issued random number (RAND) as a third enciphering key. An historic non-arbitrary value of predetermined communication events, such as a count of the number of telephone calls made by a subscriber or a count of the number of handoffs that have occurred for the subscriber unit, is maintained in both the first and second communication units. This value (count) is historic because it represents past telephone calls attributed to a communication unit, and it is non-arbitrary because this history of transactions (i.e., number of calls made) serves to identify an out-of-sync communication unit.

The first communication unit transmits (via RF signals) the modified ID and count to a second communication unit. The second communication unit compares the count maintained by the first communication unit to the count maintained by the second unit. A count discrepancy indicates a different number of calls on one unit indicating a multiple user whose count is out of sequence. The second communication unit performs the same enciphering method on the known serial number using the data received and a known second ID. The second communication unit compares the received modified serial number and the serial number generated by the fixed network communication unit to determine if the serial number is valid. The invention is designed to substantially decrease unauthorized use of a first ID of a communication unit. The authentication method does not require the second ID to ever be transmitted by RF.

This invention provides a means for detecting multiple subscribers using the same serial numbers and telephone numbers. Moreover, if a multiple user copies the information transmitted and uses the same information to access the system, the multiple user will be limited to only calling the telephone number that is in the authentication message; not a telephone number of his own choice. This authentication invention also reduces authentication errors by making more efficient use of the data transmitted and a second ID, by using them as a part of the cipher; the enciphering means does not require an additional RAND stream to be sent by a fixed network communication unit to be used as the common enciphering base and thereby eliminates this additional transmission and therefore decreases the probability of errors. This authentication scheme permits efficient roaming by allowing authentication variables for multiple calls to be sent from the "home" system to the "visited" system. These authentication variables can be stored by the "visited" switching center and used on subsequent calls. This storing allows the "visited" switching center to authenticate all subsequent calls without requiring real-time communication to the "home" system and without the associated call setup delays. It is also essential to retain the subscriber's secret keys (PIN) in the "home" switching center and not share this private information with the "visited" switching centers.

A method of stealing cellular service is to flash from a fraudulent mobile and take over an existing call. This flash message would tell the fixed network that the legitimate user is making a third party call. One possible solution to this problem is for the fixed network to initiate an authentication procedure on the traffic channel. However, the fraudulent mobile can allow the legitimate mobile to complete the authentication process. Another solution to this problem is to force the uthenticating mobile to use information that only it has available to itself. A particular embodiment to this solution would be to exclusive-or (XOR) the dialed digits of the flash message with the output of the authentication algorithm and then send this response to the fixed network for verification that the legitimate mobile is really making a third party call. In the above scenario, since only the fraudulent mobile has the dialed digits that it is sending, the legitimate mobile cannot correctly authenticate the flash message. Thus the fixed network would not complete the call from the fraudulent mobile.

In a secure cellular communication system using an encryption process utilizing at least one encryption key for encrypting information communicated over a channel, the method for preserving encryption integrity during a handoff includes: also maintaining a record of pseudo random events associated with a subscriber unit, such as the number of handoffs the subscriber unit has undergone during a given conversation with any number of source radio communication units; communicating the record, such as over a landline medium to prevent detection by an intruder, to a target radio communication unit; and restarting another encryption process for the subscriber unit using the record as an encryption variable.

BEST MODE OF OPERATION

Figure 1:
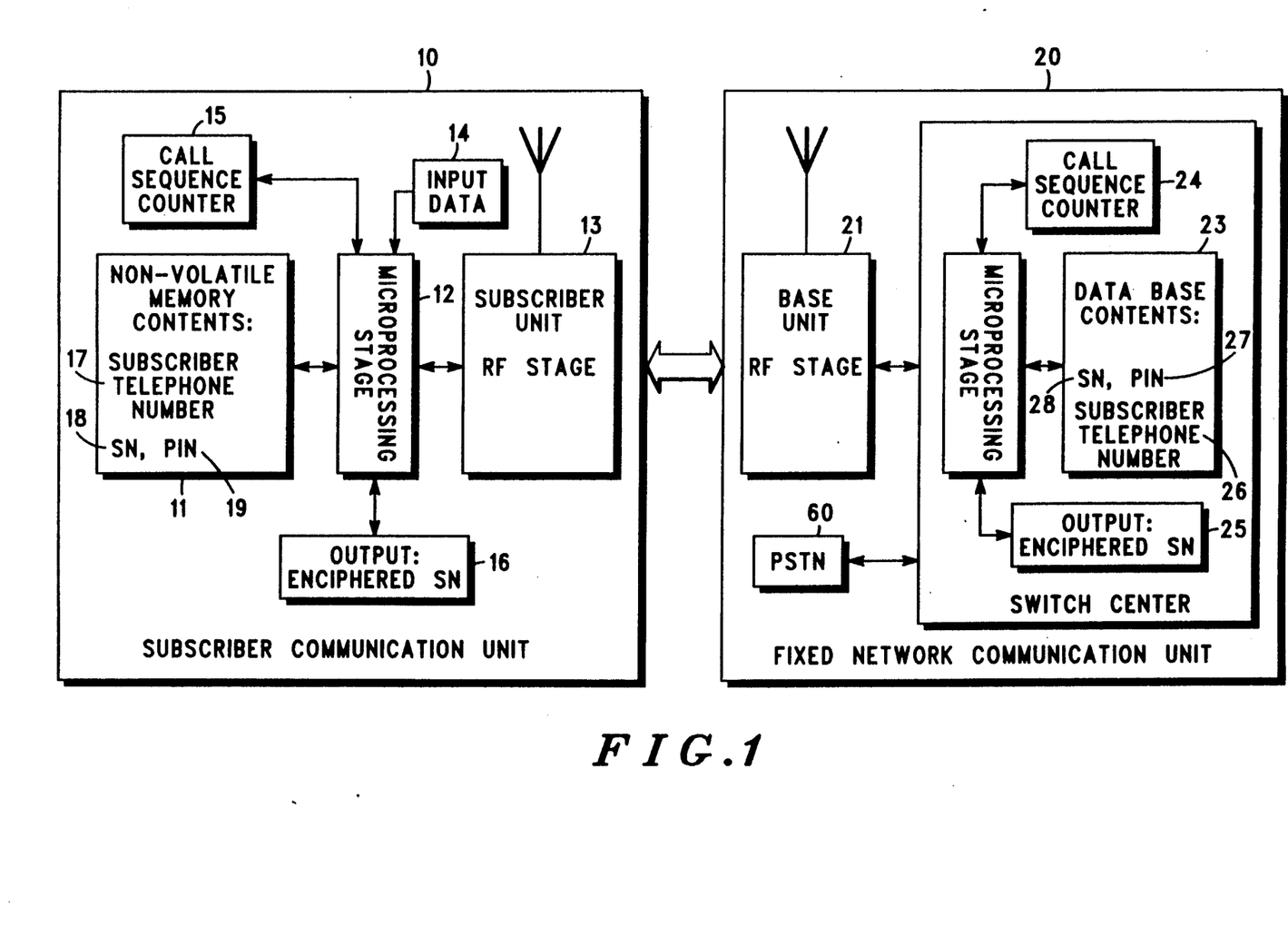
FIG. 1 is a block diagram of a typical subscriber communication unit and fixed network communication unit.

FIG. 1 generally depicts a subscriber communication unit (10) such as a subscriber telephone and a fixed network communication unit (20) such as a cellular telephone basesite and switching center. The subscriber communication unit (10) is comprised of a microprocessing stage (12), a non-volatile memory unit (11), a radio frequency (RF) stage (13), all as well understood in the art. Additional elements include a data input stage (14) such as a key entry pad on a telephone (to enter a telephone number-data), a subscriber call sequence counter (15), and an output from an enciphering stage referred to as the enciphered serial number (16).

Within the non-volatile memory unit (11) resides the serial number (18) (for the subscriber unit), the PIN (19), and the subscriber telephone number (17) (which can have, for example, characteristics of a Mobile Identification Number (MIN)). The PIN is a second ID known only to the subscriber unit and the fixed network unit. For example, it should not be available to an installer of the subscriber unit, it should only be available to a legitimate user of a subscriber unit and a fixed network communication unit database. The subscriber need only enter the PIN one time to activate it. The PIN may be changed by the subscriber, but the change must also be made known to the fixed network unit. These identifiers need not necessarily be numbers but may correspond to any attribute capable of being identified by the fixed network communications unit. An alternative embodiment, for example, in a cellular system, may include a stored look up table containing multiple sets of serial numbers, PIN's, and telephone numbers with each set of identifiers corresponding to a specific cellular or fixed network communication unit.

The fixed network communication unit (20) includes a switching center which is comprised of a microprocessing stage (22), a database (23), and a link to a basesite radio frequency stage (21), all as well understood in the art. Additional elements include a fixed network unit call sequence counter (24) and an enciphered serial number generated by the fixed network unit (25). Additionally, the switching center has an interface to the Public Switched Telephone Network (PSTN) (60). The PSTN link can be used for "visited" switching center to "home" switching center communications as required for authentication and billing of roaming subscriber units.

The database includes information regarding the subscriber unit's: serial number (18), PIN (19), and subscriber telephone number(17); the information is a copy of these ID's. The serial number (18), PIN (19), and telephone number (17) of the subscriber communication 5 telephone number (26) as stored in the fixed network communication unit (20). Communication between the subscriber communication unit (10) and the fixed network communication unit (20) is accomplished via RF transmissions between the two units in accordance with 10 well understood cellular system techniques.

Figure 2:
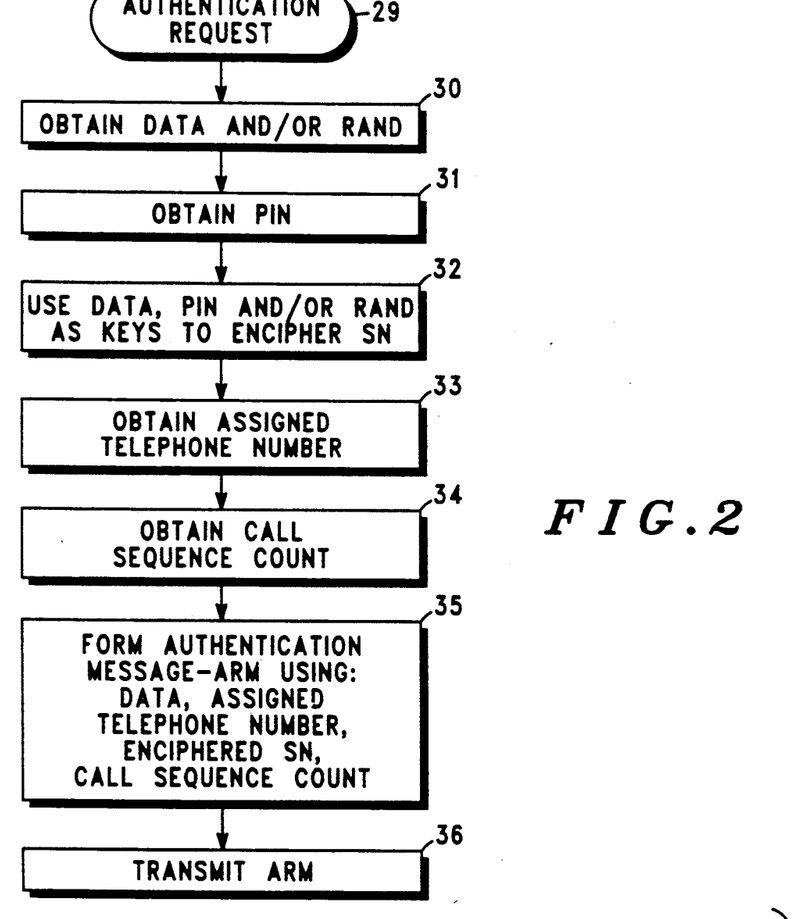
FIG. 2 is a flow chart of the identification enciphering method used by a subscriber communication unit.

When authentication is required of the subscriber communication unit (10), the subscriber unit enciphers its serial number (18) and increments its call sequence counter (15). FIG. 2 depicts the method used by a subscriber communication unit to encipher its serial number before transmission to a fixed network communication unit during an authentication request (29). This method requires use of at least two enciphering keys. The subscriber unit obtains the called telephone number (data)(30) and obtains PIN (31) from memory and uses at least parts of these two components as the enciphering keys to encipher its serial number (32). Alternatively, the subscriber unit obtains the called telephone number (DATA), a network issued random number (RAND) (30), a current subscriber's system number (historical data) as well as PIN (31) and uses at least parts of these components as the enciphering keys for enciphering its serial number (32). If PIN and the called telephone number are comprised of bits, the parts of these keys to be used are the contents of the bits and the bit length of each key. For example, an enciphered serial number may have a different bit length than the unenciphered serial number, or unmodified first ID, depending on the contents of the PIN or the data. Varying the enciphered SN bit length may also be a function of another event known to both the subscriber and fixed network unit such as the time of day.

The algorithm to integrate the enciphering keys may be varied to accommodate various levels of security depending upon the requirement of the system. The final step prior to transmission of the Authentication Response Message is to logically transform the enciphered message using the telephone number (data). This transformation is essential in assuring that a "visited" switching center can use the stored authentication variables it received previously from the subscriber's "home" switching center. The authentication variables issued by the "home" system make no assumptions about the telephone number (data) that the subscriber will use. Thus the "visited" system can compute the ARM based on the authentication variables it received from the "home" system and the received telephone number (data). The subscriber identification enciphering method does not require authentication to be confirmed by the fixed network communication unit before data is transmitted. Combining PIN with data adds the ability of the system to encipher a serial number into a complex code to an extent sufficient to substantially eliminate unauthorized detection by RF eavesdropping and unauthorized divulgence by installers.

The modified serial number (enciphered SN) becomes a component of the Authentication Request Message (ARM) (35) that is transmitted via RF (36) to the fixed network communication unit. Once encipherment is complete, the assigned telephone number is obtained (33) from memory. This number is not enciphered as part of the authentication procedure. This identifier is a component of the ARM (35) that informs the fixed network unit that the authentication request is coming from a valid subscriber unit.

The call sequence count is then obtained (34) and also used in the ARM (35). The call sequence count is updated (incremented or decremented) each time a predetermined event occurs such as when the authentication procedure is initiated or when a call is completed. The count may be maintained by the subscriber and fixed network unit using a rollover type counter such as a ring counter. This count is used by the fixed network communication unit as a means to count the number of calls made by each subscriber. Another suitable count to be used in conjunction with, or instead of, the call sequence count is the number of handoffs associated with the subscriber unit. Because a record of the number of calls made by each subscriber is maintained by both the subscriber unit and the fixed network communication unit, another subscriber trying to use the same serial number will be detected because it will not have made the exact same number of calls as the legitimate subscriber. The call sequence count information is communicated to the fixed network unit as one component of the Authentication Request Message. The ARM can be communicated in any acceptable format or in any number of stages. Components of a typical ARM (35) include data, the enciphered serial number, the call sequence count, and the assigned telephone number. An alternative embodiment would include modifying the call sequence count using the same enciphering method that is used to modify the SN. This would further enhance the protection because the count is also disguised using the PIN and data; each subscriber would generate a different value for the same count (number of calls made).

Figure 3:
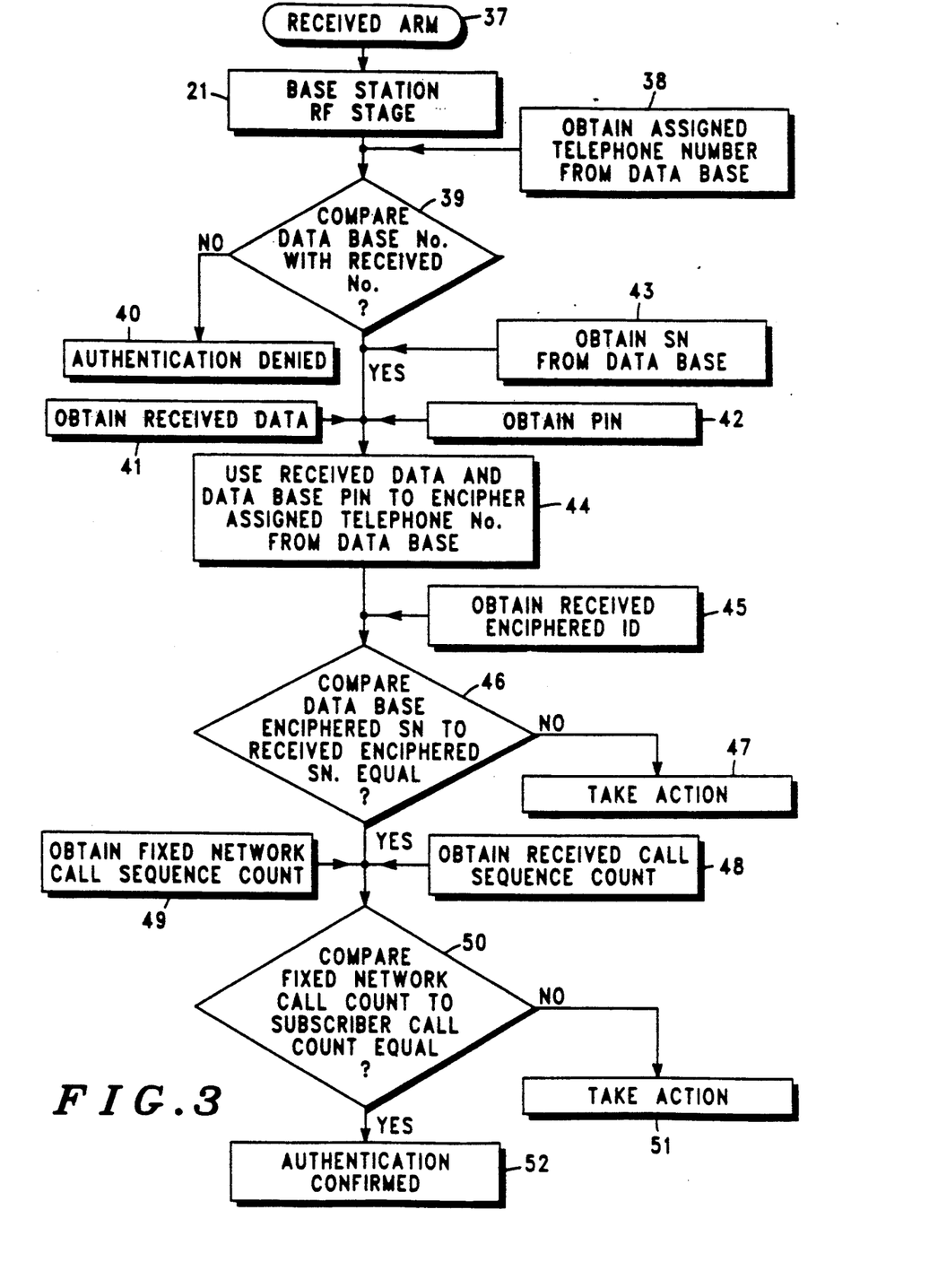
FIG. 3 is a flow chart of the authentication used by a fixed network communication unit in accordance with the invention.

A fixed network communication unit receives a transmitted ARM and uses this information to determine whether authentication should be granted to the subscriber unit. FIG. 3 depicts the authentication method performed by a fixed network unit. The ARM is received (37) by the fixed network unit by means of the base RF unit (21). The fixed network unit has access to assigned telephone number's, serial number's and PIN's of valid subscriber units through its database. The fixed network unit determines if the assigned telephone number received in the ARM is valid (39) by obtaining from the fixed network unit database the same assigned telephone number (38). A comparison is made between the received telephone number from the subscriber unit and the valid number found in the database (39). If the assigned telephone number is not recognized by the fixed network unit, authentication is denied (or some other action taken) (40).

If the assigned telephone number is determined to be valid (it is found in the database), the fixed network unit then retrieves from the database the serial number and PIN corresponding to that particular assigned telephone number. The fixed network unit then, uses the PIN from the database and the data received in the ARM as enciphering keys as elements of its enciphering method (44), which is the same method used in the subscriber unit, and generates its own enciphered serial number. The fixed network unit compares this enciphered serial number to the serial number enciphered by the subscriber unit(46). If they are not substantially the same, then the system denies access or takes some other predetermined course of action (47). If they are within the acceptable tolerance, the received call sequence count is obtained (48) and compared (50) to the call count maintained by the fixed network communication unit (49). If the counts are substantially equal, authentication may be confirmed (52) which is the first predetermined course of action. At this point, the subscriber may be allowed to communicate with the third communication unit associated with the dialed number. This third unit may more generally be termed a requested communication resource. If the count is not within the acceptable tolerance, authentication may be denied or the authorities may be notified that a multiple user is attempting to access the system (51).

The fixed network unit call counter maintains the number of times authentication is granted to a subscriber. Each subscriber has its own call counter. Having a continuous call counting scheme between a subscriber and a fixed network communication unit prevents another subscriber from using some other subscriber's identification number because the thief would not have made the identical number of calls that the legitimate subscriber made. This discrepancy is flagged by the fixed network unit when it compares the two counts.

Protection against illegitimate users is further enhanced by the encipherment method's use of the enciphered dialed telephone number and the PIN (which is not transmitted). Without an illegitimate user knowing a subscriber's PIN and the exact algorithm that enciphers the serial number, a thief is limited to merely copying the authentication message of a subscriber and repeating this message. Each time a subscriber dials a different telephone number, a different authentication request message is generated because each subscriber has a different PIN; each subscriber generates a different authentication request message for the same telephone number.

Although a thief may detect the call sequence count (because it is not enciphered in the ARM) and update it, a correct count would only allow the thief to gain authentication for the enciphered dialed telephone number he intercepted. Therefore the illegitimate user can only communicate to the subscriber whose enciphered telephone number matches that copied from the ARM.

An alternative embodiment comprising the call sequence count may allow each subscriber to maintain more than one call counter where a separate call counter is required for each fixed network communication unit. This embodiment would find use in a cellular communication system which allowed a subscriber to use multiple fixed network communication units. Another alternative embodiment to the flow in FIG. 3 may require the step of comparing the call sequence counts (50) to occur before the step involving the comparison of enciphered serial numbers (46).

Figure 7:
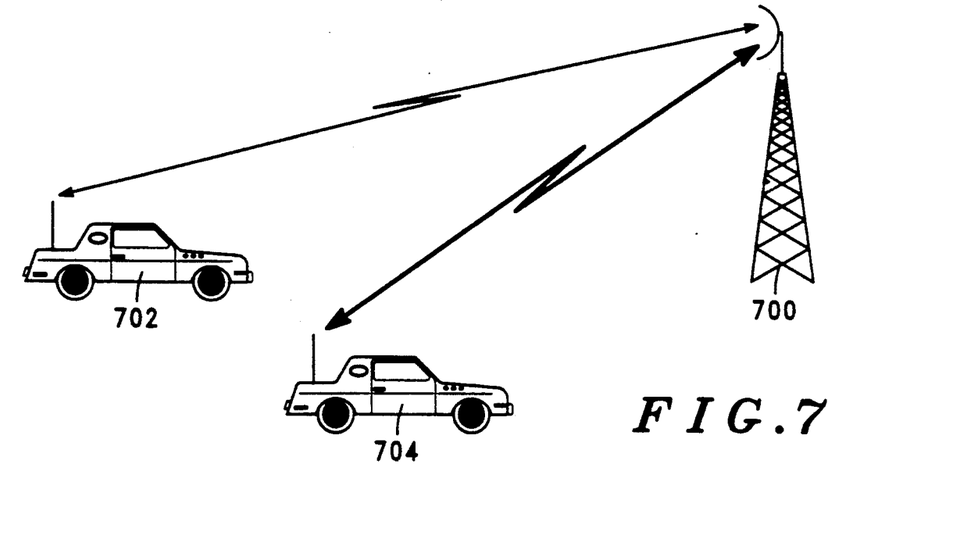
FIG. 7 is a diagram depicting a method of stealing cellular communication service which is eliminated by the authentication method shown in FIG. 6.

In FIG. 7, a method of stealing cellular service is shown. In particular, an illegitimate user (704) waits until a legitimate user (702) makes a valid call. The illegitimate user then overpowers the traffic channel between the legitimate user (702) and a base site (700) with a third party flash call. The illegitimate user (704) drops off of the traffic channel while the base site (700) sends an authentication request message to the legitimate user (702). The legitimate user (702) responds to the authentication request, correctly. Thus, the base site connects the third party call. Meanwhile, the illegitimate user (704) overpowers the traffic channel and takes control. The original call between the legitimate user (702) and the base site (700) is lost and the legitimate user (702) drops out of the traffic channel. As a result, the illegitimate user (704) continues the call with the third party that was called and the billing for the call is sent to the legitimate user (702).

Figure 6:
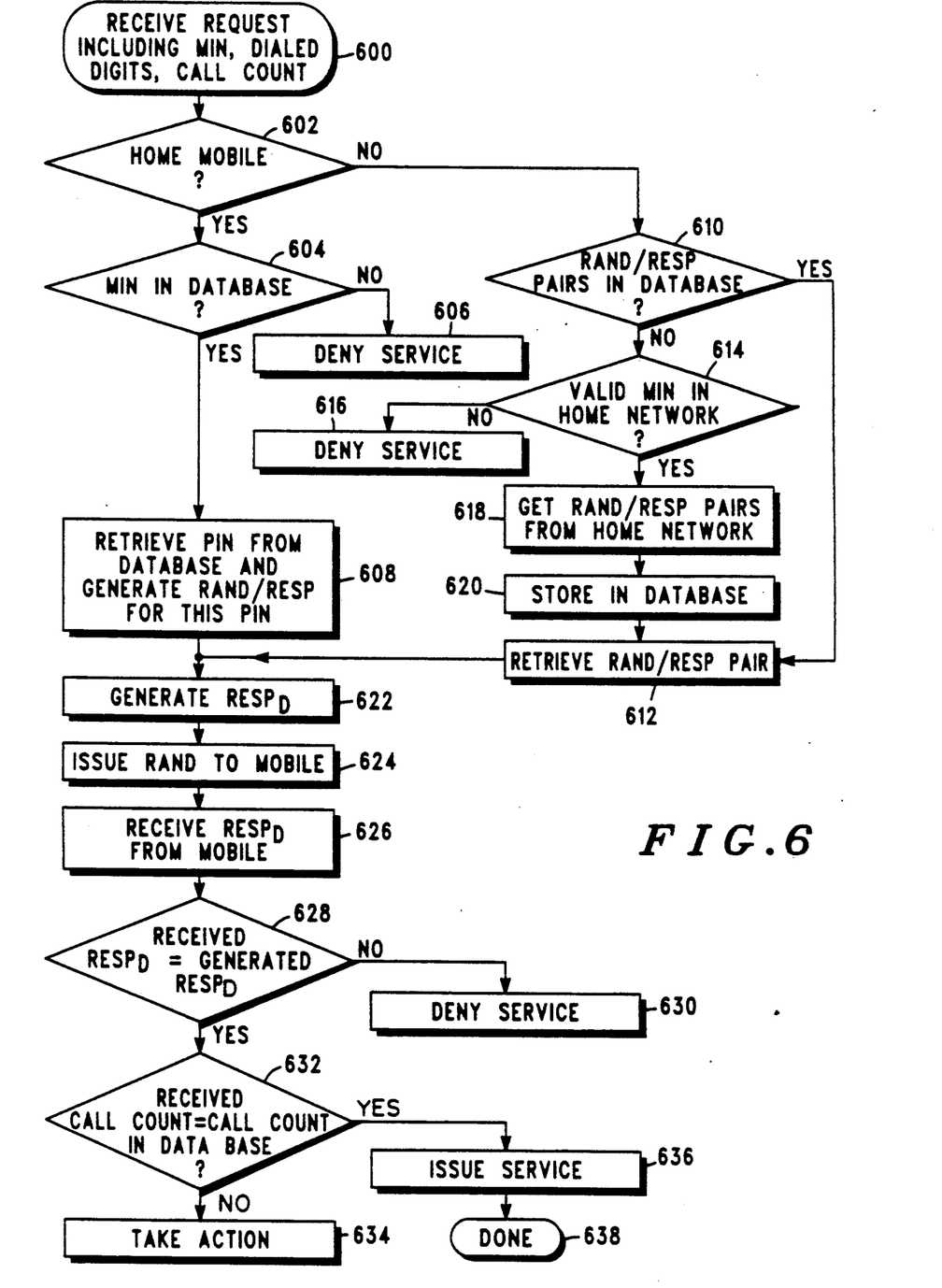
FIG. 6 is a flowchart of an alternative authentication method used by a fixed network communication unit.

In FIG. 6, a method of eliminating this form of stealing cellular service is shown. This elimination is accomplished by requiring the authentication response message from a mobile unit to contain an exclusive-or of at least part of the response message with the dialed digits. Since the legitimate mobile unit does not know the illegitimate mobile units dialed digits, the legitimate mobile unit authenticates incorrectly and the third party call of the illegitimate mobile unit does not go through.

Referring now to FIG. 2 and FIG. 6, in particular, FIG. 6 depicts an alternative authentication method used by a fixed network communication unit which supports authentication of roaming mobile units. In this embodiment an Authentication Request Message (ARM) is received from a subscriber communication unit (10) (mobile unit) by the fixed network unit (20) through a base unit RF stage (21). The ARM preferably includes a Mobile Identification Number (MIN), the Dialed Digits (Data) and a Call Sequence Count. From the received ARM the fixed network unit (20) determines whether the received ARM comes from a mobile in its home network (602).

If the received ARM is from a home mobile unit, then the fixed network unit (20) determines if the assigned MIN (preferably telephone number) in its database (23) is the same as the MIN received in the ARM (604). A comparison is made between the received MIN from the mobile unit (10) and the valid MIN found in the database (23). If the received MIN is not recognized by the fixed network unit (20), service is denied (or some other action is taken) (606). Otherwise, if the received MIN is determined to be valid (it is found in the database), then the fixed network unit (20) retrieves a Personal Identification Number (PIN) from the database (23) and generates a particular random/response pair (RAND/RESP) from this PIN (608). The RAND preferably is a random number and the RESP preferably is a number which is generated as a function of the RAND and the particular subscriber's PIN. In alternative embodiments it will be appreciate that the RESP may be generated as a function of additional elements such as a MIN, Electronic Serial Number, and/or rolling key. Subsequently, the authentication method continues at step (622).

Otherwise, if the received ARM is not from a home mobile, then the fixed network (20) checks its database (23) for RAND/RESP pairs for this visiting mobile unit (610). If the database (23) contains RAND/RESP pairs for this visiting mobile unit, then the fixed network (20) retrieves a particular RAND/RESP pair for use in this particular authentication process (612) and continues the authentication process at step (622). Otherwise, if the fixed network unit's database (23) does not contain RAND/RESP pairs for this visiting mobile unit, the fixed network unit (20) preferably accesses the visiting mobile unit's home network via a PSTN link (60). The home network determines if the assigned MIN (preferably telephone number) in its database is the same as the MIN received in the ARM (614). A comparison is made between the received MIN from the visiting mobile unit and the valid MIN found in the home network's database. If the received MIN is not recognized by the home network, service is denied (or some other action is taken) (616). Otherwise, if the received MIN is determined to be valid (it is found in the database), then the home network provides RAND/RESP pairs for this visiting mobile unit to the visited network unit (20) preferably via the PSTN link (60) (618). The fixed network unit (20) stores these received RAND/RESP pairs in database (23) (620). Subsequently, the fixed network (20) retrieves a particular RAND/RESP pair for use in this particular authentication process (612) and continues the authentication process at step (622).

At authentication step (622), the fixed network unit (20) generates a $RESP_D$ which is a logical function of the RESP associated with the particular RAND for this authentication process and the Dialed Digits received in the ARM (preferably an XOR function or other nondestructive logical function). Subsequently, the fixed network unit (20) issues the particular RAND to the mobile unit (10) (624). The mobile unit (10) generates a RESP from this particular RAND using a particular method which is the same method as the one used by the network unit (either home or visited network unit). Then, the mobile unit (10) generates a $RESP_D$ which is a logical function of the mobile generated RESP and the Dialed Digits sent in the ARM (preferably an XOR function or other non-destructive logical function) and provides the mobile generated $RESP_D$ to the fixed network unit (626). The fixed network unit (20) compares this received $RESP_D$ to the network unit generated $RESP_D$ (628). If they are not substantially similar, then service is denied (or some other action is taken) (630).

Otherwise, if the two $RESP_D$'s are substantially similar, then the Call Sequence Count received in the ARM is compared to the Call Sequence Count maintained by the fixed network unit (10) (632). If the counts are not within an acceptable tolerance, then the service is denied, the authorities may be notified that a multiple user is attempting to access the system (634) and/or some other appropriate action is taken. Otherwise, if the counts are substantially equal, authentication may be confirmed and service issued (636). At this point, the mobile unit (10) may be allowed to communicate with the third communication unit associated with the Dialed Digits received in the ARM and the authentication process is done (638).

Figure 4:
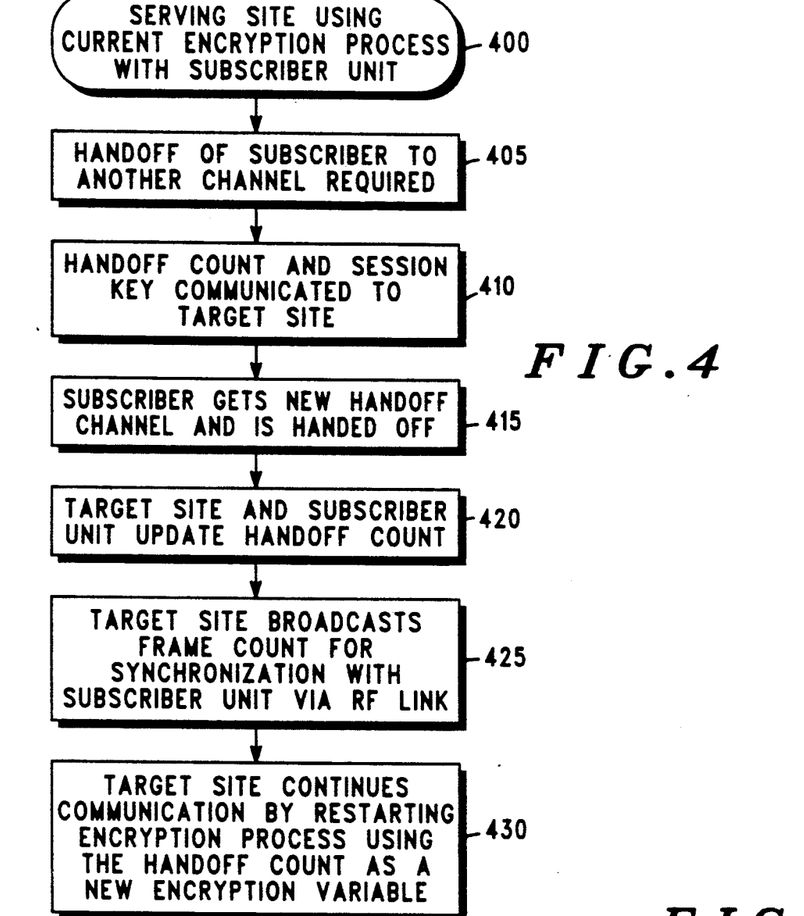
FIG. 4 is a flow chart generally depicting the method of preserving encryption integrity during handoffs in accordance with the invention.

FIG. 4 begins with block 400 wherein the source basesite is currently using a first encryption process to secure the traffic channel over which speech is being communicated between the subscriber unit and the source station. Once a handoff is required (405) both the subscriber unit and neighboring base sites are used in determining the proper target site using well known cell selection techniques. After the proper channel and target site are identified, the current handoff count and the session key are communicated over the landline network to the target site (410). The subscriber unit is given the new handoff channel over which it will communicate with the target unit (415). The subscriber unit and target site then modify their handoff count registers (420).

The target site will broadcast a frame count over an RF link to the subscriber unit for a short period of time after a channel has been assigned (425). The target basesite will cease the broadcast once the subscriber unit has acquired the correct frame count. The handoff count is therefore maintained by the subscriber unit and source basesite, updated for each handoff, and is typically unique for each call. The combination of the handoff count and the frame count serves as a pseudo-secret crypto-sync variable. The target site continues communication with the subscriber unit on the target channel by restarting the encryption process using the received handoff count as a new encryption variable (430).

As appreciated by those of ordinary skill in the art, the target unit and the source unit may be the same communication unit as in the case of a channel handoff between time slots from the same carrier frequency or a transfer to another code in the same time slot as in a code division multiplexed system.

This method of preserving encryption integrity uses a substantially random variable as a new encryption variable for the time slot from which the target site continues communication each time a handoff occurs. It also forces the encryption process to start again after each handoff thereby not requiring continuous encryption process synchronization between voice coders from differing sites or channels. Such an encryption scheme uses the pseudo random events of handoffs associated with a subscriber unit, such as between subscribers and various channels, to ensure adequate protection from unauthorized listeners. The degree of randomness of the number of handoffs that may occur during any given conversation depends on such factors as cell size, propagation medium characteristics, receiver sensitivities of the subscriber unit and base sites, handoff thresholds as set by the system operator, and various other factors. Consequently, the handoff count in microcellular systems and in-building systems may vary substantially more than a rural system having large cells. Unlike these pseudo random events, predictable events such as the time of day or absolute frame number (as in a synchronous TDMA system), do represent adequate encryption variables since they do not offer same degree of randomness. The intruder can readily predict an amount of elapsed time since the last call or handoff or can readily determine the absolute frame number since it is generally broadcast over the RF medium. In the case of a synchronous TDMA system, the target site may determine proper frame count synchronization from the switch, source site, or other suitable means.

Figure 5:
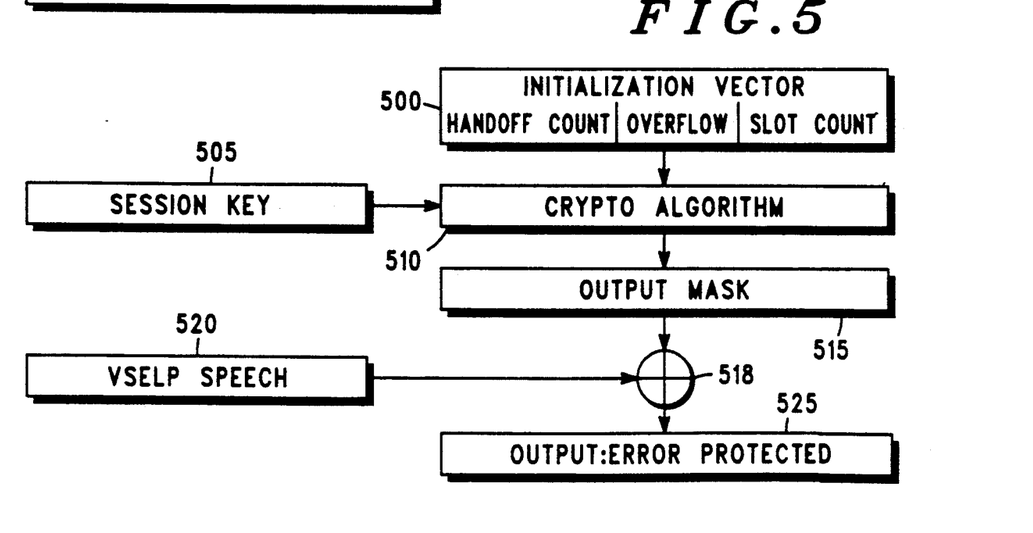
FIG. 5 is a diagram generally depicting the encryption elements in accordance with the invention.

FIG. 5 shows an bit map for a typical initialization vector (500) and key field (505) for carrying out the method of preserving encryption integrity during handoffs. The encryption key field is termed the session key field since it is unique for each session or call and changes on a per call basis. The initialization vector (500) includes the pseudo random encryption variable and is maintained by both the subscriber unit and the basesite and changes for each slot. The initialization vector (500) contains 32 bits and these 32 bits are combined with the session cryptokey (505) to produce 159 bits needed for each slot. The 32 bits are divided between three counters: an eight bit handoff counter, a nine bit speech slot counter, and a fifteen bit speech slot overflow counter. The handoff counter is updated as previously described. The slot counter is given the slot count of the target unit and overflow counter is started from a count of zero at the beginning of a call and at every handoff thereafter. The basesite establishes synchronization with the subscriber unit by sending, via RF, the nine bits of the slot counter during every slot, for a predetermined time, at the beginning of its transmission until the target site correctly decrypts speech, which may be generated using VSELP coding or other suitable speech coding method, from the subscriber unit or until the predetermined time elapses.

The session key field in combination with the initialization vector are used in an encryption algorithm (510)

to generate an output mask (515) which is exclusive ORed (518) with the speech (520) or data. This output is then further error coded using known error protection techniques (525).

The session key and the handoff counts are communicated over the landline network between base sites to prevent detection by RF intruders. Since the subscriber itself maintains a handoff count and the fixed network also maintains the count, there is no need to broadcast this information over an RF channel thereby keeping the handoff count a pseudo-secret crypto-variable.

The above method provides synchronization for speech encryption in a system that does not have an absolute frame synchronization scheme between base sites. However, as obvious to those of ordinary skill in the art, the method for preserving encryption integrity during handoff may be readily applied to any suitable secure cellular system. Although a count of channel handoffs is the preferred pseudo random event, other suitable pseudo random events may also be used including the number of calls made by a given subscriber unit, or the number of power changes a subscriber unit undergoes. As appreciated by those skilled in the art, a record of pseudo random events may include other representations of the events other than a count of such events. Maintaining a count is only one way of representing events.

As appreciated by those skilled in the art, numerous alternative embodiments may be devised without departing from the spirit and scope of the claimed invention.

What we claim is:

1. A method for maintaining secure communications through an encryption process between a subscriber unit and radio communication units of a telecommunication system, comprising:
   maintaining a record of pseudo random events associated with the subscriber unit;
   communicating the record to a particular target radio communication unit; and
   continuing the encryption process occurring between the subscriber unit and the particular target radio communication unit by using the record as an encryption variable.

2. The method of claim 1 wherein:
   secure communications are maintained through an encryption process between the subscriber unit and radio communication units of the telecommunication system during a communication channel handoff;
   the record comprises a record of a number of pseudo random events occurring between the subscriber unit and at least one radio communication unit;
   the subscriber unit and the at least one radio communication unit maintain the record; and
   the at least one radio communication unit communicates the record to the target radio communication unit during the communication channel handoff.

3. The method of claim 1 wherein the record of pseudo random events comprises a record selected from the group consisting essentially of the number of channel handoffs attributed to the subscriber unit and a slot count assigned to the particular target radio communication unit.

4. The method of claim 1 wherein the encryption process comprises using the encryption variable to encode information selected from the group consisting essentially of speech information and data information.

5. A telecommunication device which maintains secure communications through an encryption process between a subscriber unit and radio communication units remotely located from the subscriber unit, comprising:
   record means for maintaining a record of pseudo random events associated with the subscriber unit; and
   communication means, operatively coupled to the record means, for communicating the record to a particular target radio communication unit on a communication channel such that the encryption process can be continued between the subscriber unit and the particular target radio communication unit by using the record as an encryption variable.

6. The telecommunication device of claim 5 wherein:
   secure communications are maintained through an encryption process between the subscriber unit and radio communication units of the telecommunication system during a communication channel handoff;
   the record comprises a record of a number of pseudo random events occurring between the subscriber unit and at least one radio communication unit;
   the telecommunication device maintains the record; and
   the telecommunication device communicates the record to the target radio communication unit during the communication channel handoff.

7. The telecommunication device of claim 5 wherein the record of pseudo random events comprises a record selected from the group consisting essentially of the number of channel handoffs attributed to the subscriber unit and a slot count assigned to the particular target radio communication unit.

8. The telecommunication device of claim 5 wherein the telecommunication device is selected from the group consisting essentially of the subscriber unit and a particular radio communication unit.

9. A telecommunication device which maintains secure communications through an encryption process between a subscriber unit and radio communication units remotely located from the subscriber unit, comprising:
   receiving means for receiving a record of pseudo random events associated with the subscriber unit from over a communication channel; and
   encrypting means, operatively coupled to the receiving means, for continuing the encryption process between the subscriber unit and the target radio communication unit by using the record as an encryption variable.

10. The telecommunication device of claim 9 wherein:
    secure communications are maintained through an encryption process between the subscriber unit and radio communication units of the telecommunication system during a communication channel handoff;
    the record comprises a record of a number of pseudo random events occurring between the subscriber unit and at least one radio communication unit;
    the telecommunication device maintains the record; and
    the telecommunication device communicates the record to the target radio communication unit during the communication channel handoff.

11. The telecommunication device of claim 9 wherein the record of pseudo random events comprises a record selected from the group consisting essentially of the number of channel handoffs attributed to the subscriber unit and a slot count assigned to the particular target radio communication unit.

12. The telecommunication device of claim 9 wherein the telecommunication device is selected from the group consisting essentially of the subscriber unit and a particular radio communication unit.

13. A method of authentication between a subscriber unit and a radio communication unit of a telecommunication system, comprising:
providing the subscriber unit with at least part of a telephone number which uniquely identifies a target communication unit;
generating an authentication message in the subscriber unit as a function of the at least part of the telephone number; and
transmitting the authentication message and the at least part of the telephone number from the subscriber unit to the radio communication unit.

14. The method of claim 13 wherein:
the subscriber unit is provided with an identification number; and
the authentication message is generated in the subscriber unit further as a function of the identification number.

15. The method of claim 13 wherein the authentication message is generated in the subscriber unit further as a function of a random number known to the subscriber unit.

16. The method of claim 15 wherein:
the subscriber unit is provided with an identification number; and
the authentication message is generated in the subscriber unit further as a function of the identification number.

17. The method of claim 13 wherein:
the subscriber unit maintains an historic non-arbitrary value;
a modified historic non-arbitrary value is generated in the subscriber unit by modifying the historic non-arbitrary value as a function of the at least part of the telephone number; and
the modified historic non-arbitrary value is transmitted from the subscriber unit to the radio communication unit.

18. The method of claim 17 wherein the historic non-arbitrary value comprises a record of pseudo random communication events associated with the subscriber unit selected from the group consisting essentially of the number of telephone calls attributed to the subscriber unit, the number of channel handoffs attributed to the subscriber unit, and a slot count assigned to the radio communication unit.

19. The method of claim 13 wherein the authentication message is transmitted during a communication session on a radio communication link.

20. A method of authentication between a subscriber unit and a radio communication unit of a telecommunication system, comprising:
receiving, at the subscriber unit, a random number from the radio communication unit;
providing the subscriber unit with an identification number and at least part of a telephone number which uniquely identifies a target radio communication unit;
generating an authentication message in the subscriber unit as a function of the random number, the identification number, and the at least part of the telephone number; and
transmitting the authentication message and the at least part of the telephone number from the subscriber unit to the radio communication unit.

21. A method of authentication between a subscriber unit and a radio communication unit of a telecommunication system, comprising:
receiving an authentication message and at least part of a telephone number which uniquely identifies a target radio communication unit, the authentication message being derived from at least part of a requested telephone number; and
determining in the radio communication unit, through the use of the received authentication message and the received at least part of the telephone number, whether a received service request is authentic.

22. The method of claim 21 wherein:
the radio communication unit is provided with information regarding an identification number; and
the determination in the radio communication unit of whether a received service request is authentic further occurs through the use of the information regarding the identification number.

23. The method of claim 22 wherein:
the radio communication unit is a home radio communication unit for the subscriber unit; and
the information regarding the identification number is substantially similar to the identification number.

24. The method of claim 22 wherein:
the ratio communication unit is a visited radio communication unit for the subscriber unit;
the step of providing the radio communication unit with information regarding the identification number, comprises the steps of:
determining if the visited radio communication unit has information regarding the identification number;
retrieving the information regarding the identification number, if the visited radio communication unit has the information regarding the identification number; and
communicating with a home radio communication unit for the subscriber unit, subsequently retrieving the information regarding the identification number, and subsequently storing the information regarding the identification number in the visited radio communication unit, if the visited radio communication unit does not have the information regarding the identification number.

25. The method of claim 24 wherein the information regarding the identification number only comprises data derived from the identification number.

26. The method of claim 21 wherein the authentication message is further derived from a random number known to the radio communication unit.

27. The method of claim 26 wherein:
the radio communication unit is provided with information regarding an identification number; and
the determination in the radio communication unit of whether a received service request is authentic further occurs through the use of the information regarding the identification number.

28. The method of claim 21 wherein:

the radio communication unit maintains an historic non-arbitrary value;

the radio communication unit receives a modified historic non-arbitrary value, the modified historic non-arbitrary value being derived from the at least part of the requested telephone number; and the determination in the radio communication unit of whether a received service request is authentic further occurs through the use of the received modified historic non-arbitrary value and the maintained historic non-arbitrary value.

29. The method of claim 28 wherein the historic non-arbitrary value comprises a record of pseudo random communication events associated with the subscriber unit selected from the group consisting essentially of the number of telephone calls attributed to the subscriber unit, the number of channel handoffs attributed to the subscriber unit, and a slot count assigned to the radio communication unit.

30. The method of claim 21 wherein the authentication message is received during a communication session on a radio communication link.

31. The method of claim 21 wherein the step of determining further comprises:

granting communication between the subscriber unit and the target radio communication unit uniquely identified by the at least part of the received telephone number, if the received authentication message was substantially derived from the at least part of the received telephone number; and providing output indicating that a multiple user is attempting to access the radiotelephone communication system, if the received authentication message was not substantially derived from the at least part of the received telephone number.

32. A method of authentication between a subscriber unit and a radio communication unit of a telecommunication system, comprising:

generating, in the subscriber unit, an authentication message as a function of a known random number, an identification number, and the at least part of a telephone number which uniquely identifies a target radio communication unit;

transmitting the authentication message and the at least part of the telephone number from the subscriber unit to the radio communication unit;

receiving, in the radio communication unit, the authentication message and at least part of the telephone number;

generating, in the radio communication unit, an expected authentication message as a function of the known random number, known information regarding the identification number, and the received at least part of the telephone number; and determining, in the radio communication unit, whether the received service request is authentic by comparing the received authentication message and the expected authentication message.

33. A subscriber unit which authenticates communication with a radio communication unit of a telecommunication system, comprising:

input means for obtaining at least part of a telephone number which uniquely identifies a target radio communication unit;

processor means for generating an authentication message as a function of the at least part of the telephone number; and transmitter means for transmitting the authentication message and the at least part of the telephone number to the radio communication unit.

34. The subscriber unit of claim 33:

further comprising memory means for providing an identification number; and wherein the processor means comprises means for generating the authentication message further as a function of the identification number.

35. The subscriber unit of claim 33 wherein the processor means comprises means for generating the authentication message further as a function of a random number known to the subscriber unit.

36. The subscriber unit of claim 35:

further comprising memory means for providing an identification number; and wherein the processor means comprises means for generating the authentication message further as a function of the identification number.

37. The subscriber unit of claim 33:

further comprising memory means for maintaining an historic non-arbitrary value;

wherein the processor means comprises means for generating a modified historic non-arbitrary value by modifying the historic non-arbitrary value as a function of the at least part of the telephone number; and wherein the transmitter means comprises means for transmitting the modified historic non-arbitrary value to the radio communication unit.

38. The subscriber unit of claim 37 wherein the historic non-arbitrary value comprises a record of pseudo random communication events associated with the subscriber unit selected from the group consisting essentially of the number of telephone calls attributed to the subscriber unit, the number of channel handoffs attributed to the subscriber unit, and a slot count assigned to the radio communication unit.

39. The subscriber unit of claim 33 wherein the transmitter means transmits the authentication message during a communication session on a radio communication link.

40. A subscriber unit which authenticates communications with a radio communication unit of a telecommunication system, comprising:

receiver means for receiving a random number from the radio communication unit;

input means for obtaining at least part of a telephone number which uniquely identifies a target radio communication unit;

memory means for providing an identification number;

processor means for generating an authentication message as a function of the random number, the identification number, and the at least part of the telephone number; and transmitter means for transmitting the authentication message and the at least part of the telephone number to the radio communication unit.

41. A radio communication unit of authentication between a subscriber unit and a radio communication unit of a telecommunication system, comprising:

memory means for providing a random number and information regarding an identification number;

receiver means for receiving an authentication message and at least part of a telephone number which uniquely identifies a target radio communication unit, the authentication message being derived from the random number, the identification number, and at least part of a requested telephone number; and processor means for determining, through the use of the random number, the information regarding the identification number, the received authentication message, and the received at least part of the telephone number, whether a received service request is authentic.

42. A radio communication unit which authenticates communications with a subscriber unit of a telecommunication system, comprising:

receiver means for receiving an authentication message and at least part of a telephone number which uniquely identifies a target radio communication unit, the authentication message being derived from at least part of a requested telephone number; and processor means for determining, through the use of the received authentication message and the received at least part of the telephone number, whether a received service request is authentic.

43. The radio communication unit of claim 42:

further comprising memory means for providing information regarding an identification number; and wherein the processor means for determining whether the received service request is authentic further utilizes the information regarding the identification number.

44. The radio communication unit of claim 43 wherein:

the radio communication unit is a home radio communication unit for the subscriber unit; and the information regarding the identification number is substantially similar to the identification number.

45. The radio communication unit of claim 43 wherein:

the radio communication unit is a visited radio communication unit for the subscriber unit;

the memory means, comprises:

means for determining if the visited radio communication unit has information regarding the identification number;

means for retrieving the information regarding the identification number, if the visited radio communication unit has the information regarding the identification number; and means for communicating with a home radio communication unit for the subscriber unit, subsequently retrieving the information regarding the identification number, and subsequently storing the information regarding the identification number in the visited radio communication unit, if the visited radio communication unit does not have the information regarding the identification number.

46. The radio communication unit of claim 45 wherein the information regarding the identification number only comprises data derived from the identification number.

47. The radio communication unit of claim 42 wherein the received authentication message is further derived from a random number known to the radio communication unit.

48. The radio communication unit of claim 47:

further comprising memory means for providing information regarding an identification number; and wherein the processor means for determining whether the received service request is authentic further utilizes the information regarding the identification number.

49. The radio communication unit of claim 42:

further comprising memory means for maintaining an historic non-arbitrary value;

wherein the receiver means further comprises means for receiving a modified historic non-arbitrary value, the modified historic non-arbitrary value being derived from the at least part of the requested telephone number; and wherein the processor means for determining whether the received service request is authentic further utilizes the received modified historic non-arbitrary value and the maintained historic non-arbitrary value.

50. The radio communication unit of claim 49 wherein the historic non-arbitrary value comprises a record of pseudo random communication events associated with the subscriber unit selected from the group consisting essentially of the number of telephone calls attributed to the subscriber unit, the number of channel handoffs attributed to the subscriber unit, and a slot count assigned to the radio communication unit.

51. The radio communication unit of claim 42 wherein the receiver means receives the authentication message during a communication session on a radio communication link.

52. The radio communication unit of claim 42 wherein the processor means further comprises:

means for granting communication between the subscriber unit and the target radio communication unit uniquely identified by the at least part of the received telephone number, if the received authentication message was substantially derived from the at least part of the received telephone number; and means for providing output indicating that a multiple user is attempting to access the radiotelephone communication system, if the received authentication message was not substantially derived from the at least part of the received telephone number.

* * * * *

UNITED STATES PATENT AND TRADEMARK OFFICE
CERTIFICATE OF CORRECTION

PATENT NO. : 5,239,294
DATED : August 24, 1993
INVENTOR(S) : Flanders et al.

It is certified that error appears in the above-identified patent and that said Letters Patent is hereby corrected as shown below:

Col. 16, line 34, "ratio" should be --radio--.

Signed and Sealed this

Thirty-first Day of May, 1994

BRUCE LEHMAN

Attest:

Attesting Officer

Commissioner of Patents and Trademarks